United States Patent [19]

Shannon et al.

[11] Patent Number: 5,645,612

[45] Date of Patent: Jul. 8, 1997

[54] WELDING AND COVER SEALING MACHINE APPARATUS FOR BATTERY ASSEMBLY AND AN IMPROVED METHOD OF MANUFACTURING STORAGE BATTERIES

[75] Inventors: John K. Shannon; James M. Shannon, both of Racine, Wis.

[73] Assignee: Enersafe Corporation, Racine, Wis.

[21] Appl. No.: 567,928

[22] Filed: Dec. 6, 1995

[51] Int. Cl.$^6$ .................................................. H01M 2/24
[52] U.S. Cl. ........................ 29/623.2; 29/623.4; 29/730
[58] Field of Search ........................... 29/623.2, 623.4, 29/730

[56] References Cited

U.S. PATENT DOCUMENTS

| | | | |
|---|---|---|---|
| 3,259,525 | 7/1966 | Wilson | 29/623.2 |
| 4,025,371 | 5/1977 | Pecha | 29/623.2 X |
| 5,234,473 | 8/1993 | Piper et al. | 29/730 X |
| 5,505,744 | 4/1996 | Eberle et al. | 29/623.4 |

*Primary Examiner*—Stephen Kalafut
*Attorney, Agent, or Firm*—Jansson & Shupe, Ltd.

[57] ABSTRACT

Method and apparatus for manufacturing storage batteries. The method is directed toward manufacture of a storage battery with a single weld between intercell connectors, positive and negative plates and external terminals. The apparatus comprises a frame, holding and positioning components, a lead dispensing assembly and an edge-heater assembly for sealing the battery case. The apparatus and inventive method permit dispensing of molten lead into selective segments of the battery case substantially simultaneously with sealing of the battery case.

9 Claims, 2 Drawing Sheets

WELDING AND COVER SEALING MACHINE APPARATUS FOR BATTERY ASSEMBLY AND AN IMPROVED METHOD OF MANUFACTURING STORAGE BATTERIES

FIELD OF THE INVENTION

This invention relates generally to electricity and, more particularly, to lead-acid storage batteries.

BACKGROUND OF THE INVENTION

Lead-acid storage batteries have long been an efficient and effective source of power for a variety of applications. From every indication it is clear that such batteries will continue in heavy use into the indefinite future. While much work has been done to develop nickel-cadmium batteries, nickel-iron batteries, lithium, sodium-sulphur systems and other electrochemical storage systems, and other alternative power sources, lead-acid batteries remain and are likely to remain the best choice for strong reasons, including their relatively low cost.

The economy and dependability of lead-acid storage batteries make such batteries practical for a vast number of applications, including stand-by power systems for communication and emergency lighting, automotive and truck-starting applications, electric vehicles, wheel chairs, uninterruptable computer power supplies, and systems for solar and wind power storage, to name just a few.

The manufacturing of lead-acid batteries is a capital intensive process that currently requires a considerable amount of production machinery and floor space. This is because current lead-acid battery manufacturing process have changed very little in the past 30 years.

A significant disadvantage to conventional lead-acid storage battery construction is the many separate electrical connections which must be made within the battery as separate welding operations. Conventional lead-acid storage batteries have intercell connections inside the battery just under the top wall.

In a standard twelve-volt battery, such connections are typically made by first punching an intercell connector hole in five battery container partitions with a container Hole Punching Machine. Once the connector hole has been punched, an upstanding projection from a plate bridge of one cell is welded, through the hole, to an upstanding projection from the plate bridge of the adjoining cell. These welds are typically made above the top of the plates in the headspace of the battery.

In addition to the intercell weldmates, battery plates for six cells are welded together onto plate straps to create cell groups on a Cast On Strap Machine. These cell groups are then placed into the battery container where they are welded to one another—through the five partitions—with an Intercell Welding Machine.

After the cell groups are welded in place, a battery cover is heat sealed onto the battery container with a Cover Sealing Machine. Next, the two external terminals of the molded cover are welded onto the battery's internal end cell posts using a Post Bonding Machine. It is apparent that the process of making these welds and connections is time consuming, unduly expensive and includes the possibility of miswelds and broken welds.

Along with requiring a substantial capital investment, the multiple machines, machine operations and process variables used in the conventional manufacturing method present numerous production problems. For example, five separate machines are employed to make batteries in the conventional manner as described above. In order to operate correctly, each individual machine must be set for a given size of battery. Because the machines do not always operate at the same speeds, a conveyor is required to be placed between the machines to store batteries and compensate for production rate variables.

Additionally, because each machine must be operated individually, at least one operator per machine is generally needed. This can create problems with productivity in that if one machine has to be shut down, the entire production line stops.

Finally, a significant amount of floor space is required to house these five machines and the conveyors between them. Although production line lengths vary, a length of 250 feet is not unusual.

A method of manufacturing batteries that would eliminate the need for several expensive pieces of equipment including cast on machines and cell stackers would be an improvement in the art.

OBJECTS OF THE INVENTION

It is an object of this invention to provide a method of manufacturing and an apparatus for manufacturing lead-acid storage batteries overcoming problems in the art, including those mentioned above.

Another object of this invention is to provide a method of manufacturing and an apparatus for manufacturing lead-acid storage batteries which reduces the amount of equipment and manpower required.

Another object of this invention is to provide a method of manufacturing and an apparatus for manufacturing lead-acid storage batteries which provide improved connections between positive and negative plates and the battery terminals.

A further objective of this invention is to provide a method for manufacturing and an apparatus for manufacturing lead-acid storage batteries which substantially simultaneously dispense molten lead to form electrical connections between plates and terminals and seals the battery case.

It is also an objective of this invention to provide a method for manufacturing and an apparatus for manufacturing storage batteries storage battery which is rapid, efficient and inexpensive.

Still another object of this invention is to provide a lead-acid storage battery eliminating a substantial portion of the lead which does not contribute to power production.

These and other important objects of the invention will become apparent from the specification herein.

SUMMARY OF THE INVENTION

Our invention provides a novel battery assembly, welding and cover sealing technique and machine which combines the functions of, and replaces the five conventional battery making machines with one machine. The novel machine is designed to assemble, completely weld the circuitry and seal the cover onto the battery container almost simultaneously. The machine is specifically designed to utilize battery covers and containers as presented in U.S. Pat. No. 5,318,864 and patent application Ser. No. 437,287. The machine is designed to provide the means to efficiently utilize this new way of constructing a battery.

Basically, the machine provides a means of dispensing measured portions of molten lead into plate strap mold wells of the novel battery cover. The machine also provides a means for heating the interfaces of the battery cover and container for sealing. The machine is programmed and timed to dispense molten lead at the moment the battery cover and container have reached the optimum temperature for sealing. The machine is further programmed so that the battery cover and container are pressed together for sealing at the moment the lead dispenser moves clear of the battery cover. The battery plate lugs, extending from the inverted battery container, enter into the dispensed molten lead in the plate strap mold wells of the battery cover at the same time that the battery container and cover move together for sealing.

As the sealed cover and container cool, the molten lead solidifies and completely welds the battery plate lugs to the plate straps, and welds to the intercell connectors as well as the external battery terminals. The battery is now ready for filling and formation.

DETAILED DESCRIPTION OF PREFERRED EMBODIMENTS

Figure 1:
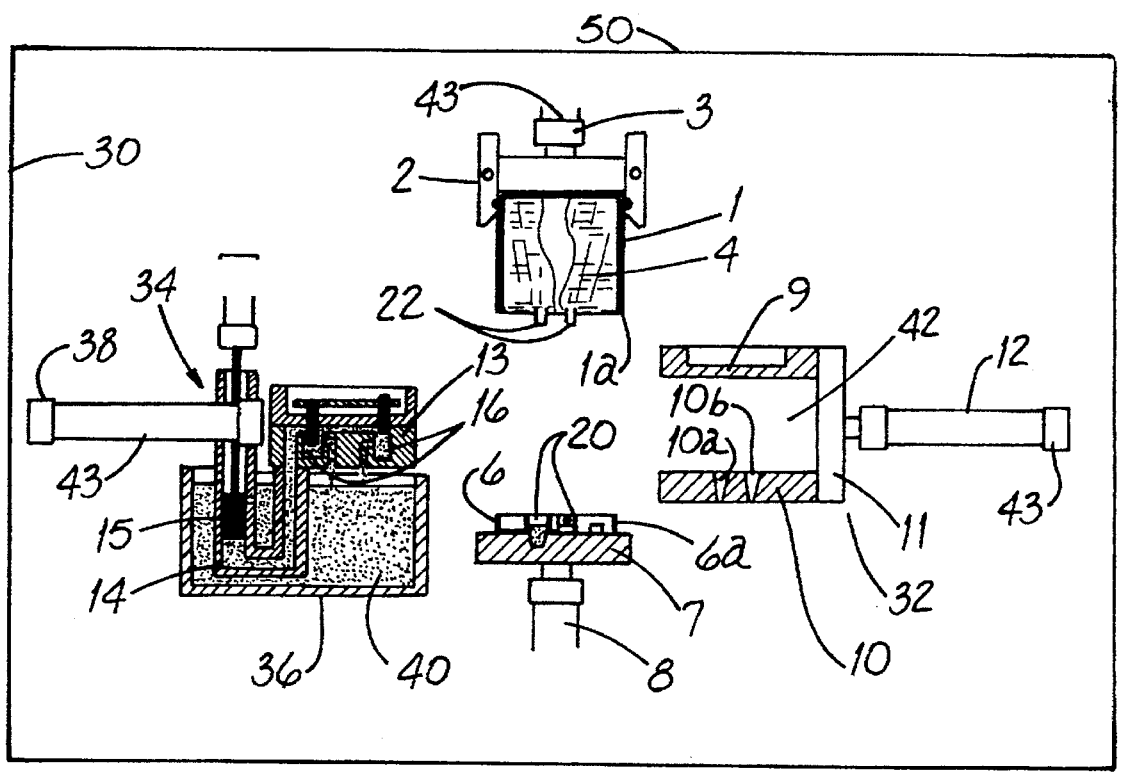
FIG. 1 is a cross-sectional view of the battery making components of the invention positioned and arranged to perform a step of the method.
Figure 2:
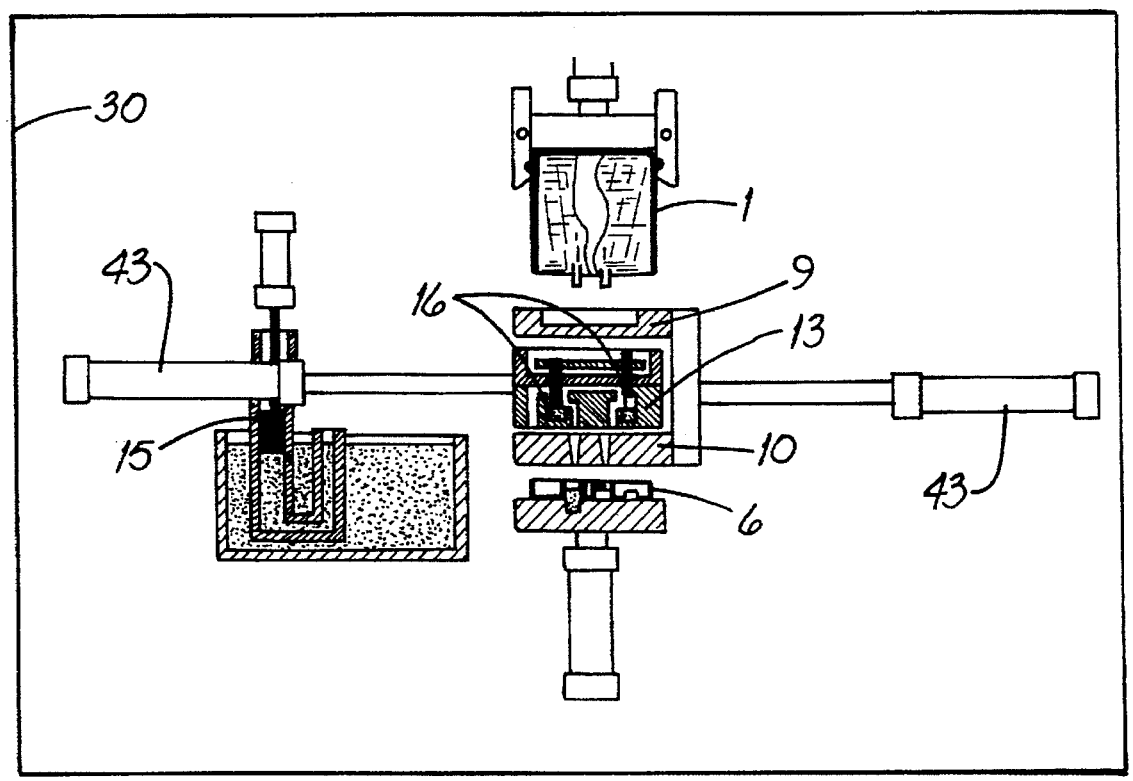
FIG. 2 is a cross-sectional view of the battery making components of the invention positioned and arranged to perform one step of the method.

FIGS. 1–4 show the components of the apparatus 50 used to practice the inventive method. Referring first to FIG. 1, there is shown an apparatus 50 for making a battery which includes a frame 30, a first holder 2 and second holder 7 secured to frame 30 to hold the respective case portions 1 and 6 in vertically-aligned opposed spaced positions. At least one powered mover 3 is secured to a respective one of the holders 2 and arranged to provide reciprocating relative vertical holder motion. An edge-heater assembly 32, having first and second edge-heating elements 9 and 10 is secured to frame 30 adjacent to the holders 2 and 7, and a first powered positioner 12 is secured to the edge-heater assembly 32 and arranged to intermittently position the edge-heating elements 9 and 10 between the vertically-spaced case portions 1 and 6 in such a way as to provide contact with edges 1a and 6a.

A lead-dispensing assembly 34 having a supply reservoir 36, and a dispensing head 13 includes a second powered positioner 38 secured to the dispensing head 13 and arranged to intermittently position the dispensing head 13 between the case portions 1 and 6 along with the edge-heating elements 9 and 10 (FIG. 2) thereby allowing dispensing of molten lead 40 into plate strap mold wells 20 of the second case portion 6 substantially simultaneously with heating of the edges 1a and 6a to a case-sealing temperature. In a highly preferred embodiment, dispensing of molten lead 40 is accurately metered.

The lead dispensing assembly 34 includes a reservoir piston 15 traveling in a cylinder 14 which forces the molten lead 40 into lead dispensing pockets 16 which include overflow ports.

In another aspect of the invention, the powered mover 3, the first positioner 12 and second positioner 38 each include a hydraulic cylinder 43 and the edge heating elements 9 and 10 are each platens that are configured to match the case-portion edges 1a and 6a.

It is also highly preferred that the powered mover 8 have a hydraulic cylinder 43 and the second edge-heating element 10 has openings 10a and 10b therethrough to accommodate the dispensing of the molten lead 40 (see FIGS. 1–4).

In still another aspect of the invention, the first and second edge-heating elements 9 and 10 are supported by a bracket 11 in such a way as to define a space 42 therebetween to receive the dispensing head 13.

FIGS. 1–4 show the steps of the inventive method of manufacturing a battery using the apparatus 50. The inventive method involves putting cell group plates 4 into having lugs 22 the cell subparts (not shown) of the first case portion 1. It is preferred that the first case portion 1 is inverted.

Cell group plates 4 are preferably held in the case portion 1 by the friction of a snug fit and, in another preferred method, are held with the assistance of an adhesive. Case portions 1 and 6 are then vertically aligned in opposed spaced positions.

Figure 3:
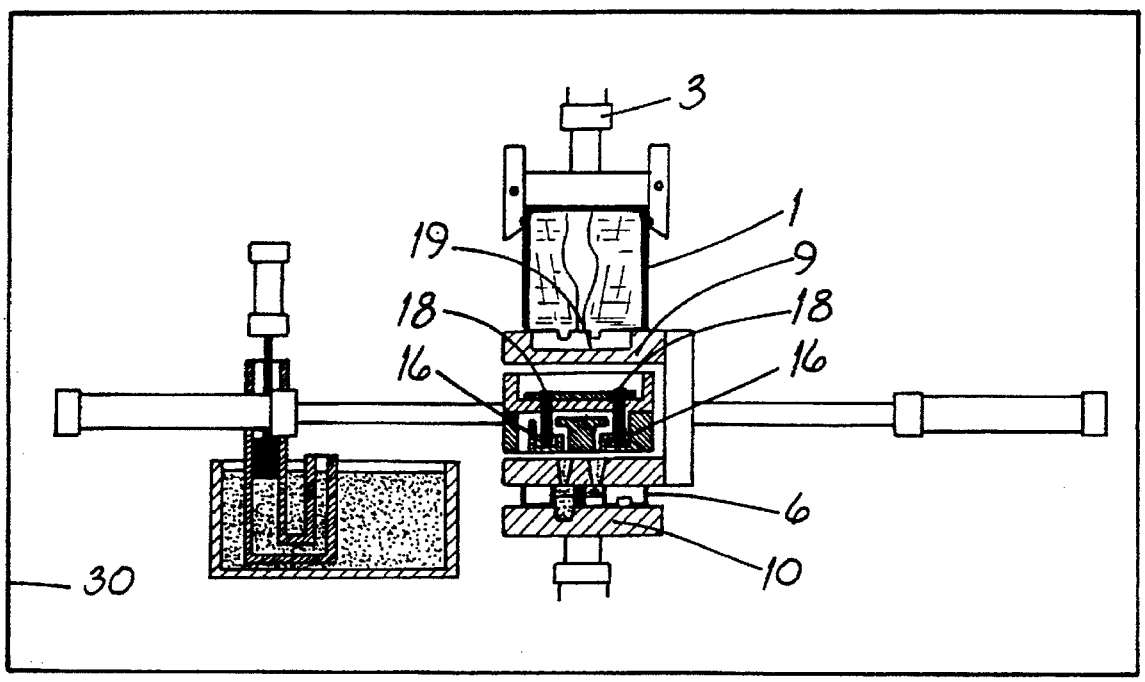
FIG. 3 is another cross-sectional view of the battery making components of the invention positioned and arranged to perform a further step of the method.

Next the sidewall and partition edges 1a and 6a of the case portions 1 and 6 are heated as shown in FIG. 3. Substantially simultaneously with the heating step, molten lead 40 is dispensed into plate strap mold wells segments 20 of the second case portion 6. Preferably, the dispensing of the molten lead 40 occurs as the case edges 1a and 6a reach a case-sealing temperature. When the case sealing temperature is reached, displacement pistons 18 mounted to the actuation plate 19 are moved down to displace the predetermined amount of molten lead 40 from lead dispensing pockets 16. Preferably the amount of molten lead 40 is metered.

Figure 4:
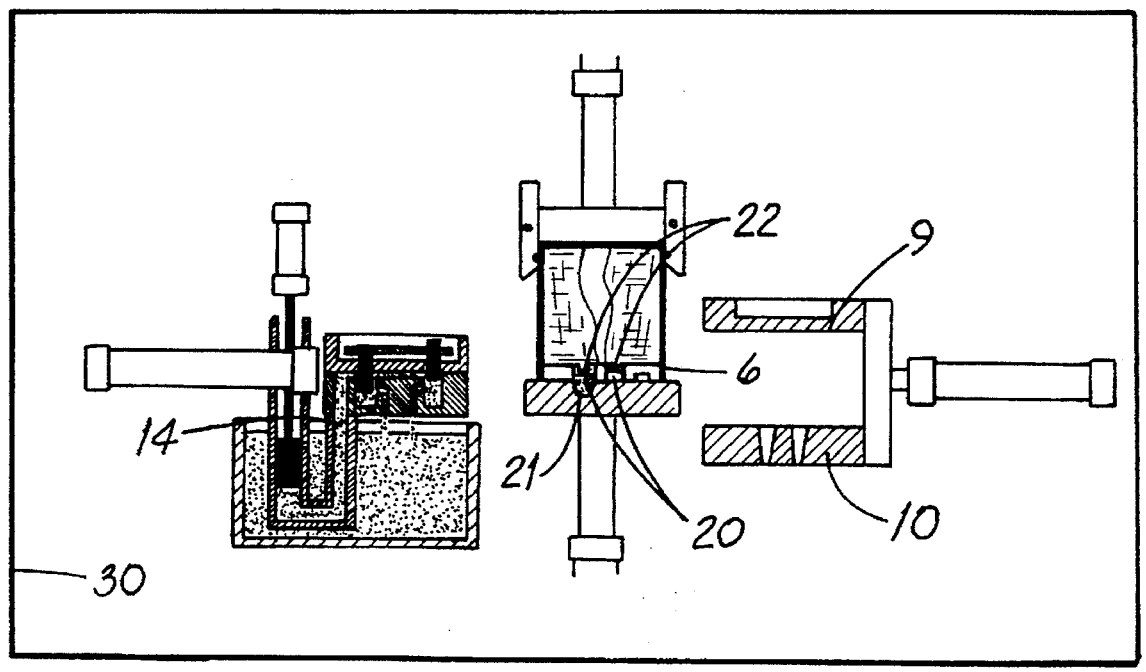
FIG. 4 is a further cross-sectional view of the battery making components of the invention positioned and arranged to perform another step of the method.

Following dispensing of the molten lead 40, the first and second edge heating elements 9 and 10 are moved clear of the first and second case portions 1 and 6 and lead dispensing head 13 is returned to lead dispensing assembly 34 as shown in FIG. 4. Substantially simultaneously, case portions 1 and 6 are brought together for the edge-to-edge sealing and to partially immerse the plate lugs 22 in the molten lead 40 forming an electrical connection.

As the first and second case portions 1 and 6 cool, the molten lead 40 solidifies and completely welds the battery plate lugs 22 to the plate straps, and welds to the intercell connectors as well as the external battery terminals 21. The battery is now ready for filling.

While the principles of the invention have been shown and described in connection with but a few embodiments, it is to be understood clearly that such embodiments are by way of example and are not limiting. For example, instead of using a reservoir piston 15 and cylinder 14 to feed the molten lead 40 to and through the lead dispenser head 13, molten lead 40 could be fed by gravity to the lead dispensing head 13 from a reservoir equipped with flow control valves.

We claim:

1. A method of manufacturing a battery having a dielectric case with opposed first and second endwalls, sidewalls and cell partitions therebetween together forming complete cells each of which contains a cell group of plates where each plate has at least one plate lug, the case formed of first and second case portions, each having a respective one of the endwalls and forming subparts of each complete cell, the first case portion further having a part of each sidewall and partition and sealed edge-to-edge to the remaining parts of each sidewall and partition of the second case portion, comprising:

putting a cell group into the cell subparts of the first case portion;

vertically aligning the case portions in opposed spaced positions;

heating the sidewall and partition edges of the case portions;

substantially simultaneously with the heating step, dispensing molten lead into a plurality of plate strap mold wells located in the second case portion;

bringing the two case portions together for the edge-to-edge sealing and to partially immerse at least one plate lug in the lead in the wells for electrical union therewith, thereby sealing the battery and the cells.

2. The method of claim 1 wherein the dispensing occurs as the edges reach a case-sealing temperature.

3. An apparatus for making a battery having a dielectric case with opposed first and second endwalls, sidewalls and cell partitions therebetween together forming complete cells each of which contains a cell group of plates, the case formed of first and second case portions each having a respective one of the endwalls and forming subparts of each complete cell, the first case portion further having a part of each sidewall and partition and sealed edge-to-edge to the remaining parts of each sidewall and partition of the second case portion, comprising:

a frame;

first and second holders secured to the frame to hold the respective case portions in vertically-aligned opposed spaced positions;

at least one powered mover secured to a respective one of the holders and arranged to provide reciprocating relative vertical holder motion;

an edge-heater assembly secured to the frame adjacent to the holders and having first and second edge-heating elements;

a first powered positioner secured to the edge-heater assembly and arranged to intermittently position the edge-heating elements between the vertically-spaced case portions for contact with the edges thereof;

a lead-dispensing assembly having a supply reservoir and a dispensing head;

a second powered positioner secured to the dispensing head and arranged to intermittently position it between the case portions, along with the edge-heating elements;

thereby allowing dispensing of molten lead into a plurality of mold wells located in the second case portion substantially simultaneously with heating of edges to a case-sealing temperature.

4. The apparatus of claim 3 wherein the mover includes a hydraulic cylinder.

5. The apparatus of claim 4 including a pair of the movers, each having a hydraulic cylinder.

6. The apparatus of claim 3 wherein the edge-heating elements are each platens configured to match the case-portion edges.

7. The apparatus of claim 3 wherein the first and second positioners each include a hydraulic cylinder.

8. The apparatus of claim 6 wherein the platen of the second edge-heating element has openings therethrough to accommodate dispensing of molten lead.

9. The apparatus of claim 3 wherein the first and second edge-heating elements are supported by bracket and define a space therebetween to receive the dispensing head.

* * * * *